United States Patent
Zargar et al.

(10) Patent No.: US 12,068,057 B2
(45) Date of Patent: Aug. 20, 2024

(54) PROCESSING SYSTEM, RELATED INTEGRATED CIRCUIT, DEVICE AND METHOD

(71) Applicants: STMicroelectronics S.r.l., Agrate Brianza (IT); STMicroelectronics International N.V., Geneva (CH); STMicroelectronics Application GMBH, Aschheim-Dornach (DE)

(72) Inventors: Asif Rashid Zargar, Greater Noida (IN); Nicolas Bernard Grossier, Oreno di Vimercate (IT); Charul Jain, Delhi (IN); Roberto Colombo, Munich (DE)

(73) Assignees: STMicroelectronics S.r.l., Agrate Brianza (MB) (IT); STMicroelectronics Aplication GmbH, Aschheim-Dornach (DE); STMicroelectronics International N.V., Geneva (CH)

( * ) Notice: Subject to any disclaimer, the term of this patent is extended or adjusted under 35 U.S.C. 154(b) by 15 days.

(21) Appl. No.: 18/056,803

(22) Filed: Nov. 18, 2022

(65) Prior Publication Data
US 2023/0170006 A1    Jun. 1, 2023

(30) Foreign Application Priority Data
Nov. 30, 2021   (IT) .................. 102021000030332

(51) Int. Cl.
*G11C 7/24*    (2006.01)
*G11C 7/10*    (2006.01)

(52) U.S. Cl.
CPC .............. *G11C 7/24* (2013.01); *G11C 7/1039* (2013.01); *G11C 7/1069* (2013.01)

(58) Field of Classification Search
CPC ....... G11C 7/24; G11C 7/1039; G11C 7/1069; G06F 2221/034; G06F 21/44;
(Continued)

(56) References Cited

U.S. PATENT DOCUMENTS 5,355,336 A * 10/1994 Yoshioka ................. G11C 7/24
365/189.08
10,289,840 B2    5/2019 Elenes et al.
(Continued)

FOREIGN PATENT DOCUMENTS

CA    2482635 C * 9/2014 ............. G06F 21/31

*Primary Examiner* — Michael T Tran
(74) *Attorney, Agent, or Firm* — Slater Matsil, LLP

(57) ABSTRACT

In an embodiment a processing system includes a plurality of storage elements, each storage element comprising a latch or a flip-flop and being configured to receive a write request comprising a data bit and to store the received data bit to the latch or the flip-flop, a non-volatile memory configured to store data bits for the plurality of storage elements, a hardware configuration circuit configured to read the data bits from the non-volatile memory and generate write requests in order to store the data bits to the storage elements and a hardware circuit configured to change operation as a function of a logic level stored to a latch or a flip-flop of a first storage element of the plurality of storage elements, wherein the first storage element comprises a further latch or a further flip-flop and is configured to store, in response to the write request, an inverted version of the received data bit to the further latch or the further flip-flop.

18 Claims, 8 Drawing Sheets

(58) Field of Classification Search
CPC .......... G06F 21/76; G06F 21/79; G06F 21/85;
G06F 21/55; G06F 13/4068; G06F
13/4282
USPC ............................................ 365/185.04, 205
See application file for complete search history.

(56) References Cited

U.S. PATENT DOCUMENTS

| | | | | |
|---|---|---|---|---|
| 2006/0095975 | A1* | 5/2006 | Yamada | H04L 9/085 |
| | | | | 726/27 |
| 2008/0022371 | A1* | 1/2008 | Chen | H04L 9/004 |
| | | | | 726/4 |
| 2008/0170436 | A1* | 7/2008 | Chun | G11C 16/22 |
| | | | | 365/185.11 |
| 2011/0286599 | A1* | 11/2011 | Tuyls | H04L 9/0866 |
| | | | | 380/278 |
| 2011/0307747 | A1* | 12/2011 | Duffy | G11C 29/32 |
| | | | | 714/718 |
| 2012/0268996 | A1* | 10/2012 | Park | G11C 16/24 |
| | | | | 365/185.12 |
| 2013/0250698 | A1* | 9/2013 | Kim | G11C 16/26 |
| | | | | 365/185.25 |
| 2018/0240371 | A1* | 8/2018 | Schwar | G09F 3/0376 |
| 2018/0293181 | A1* | 10/2018 | Jang | G06F 21/79 |
| 2018/0357012 | A1 | 12/2018 | Colombo | |
| 2018/0357015 | A1 | 12/2018 | Colombo | |
| 2019/0026498 | A1 | 1/2019 | Colombo | |
| 2019/0227747 | A1 | 7/2019 | Colombo | |
| 2022/0164297 | A1* | 5/2022 | Sity | G06F 12/0802 |

\* cited by examiner

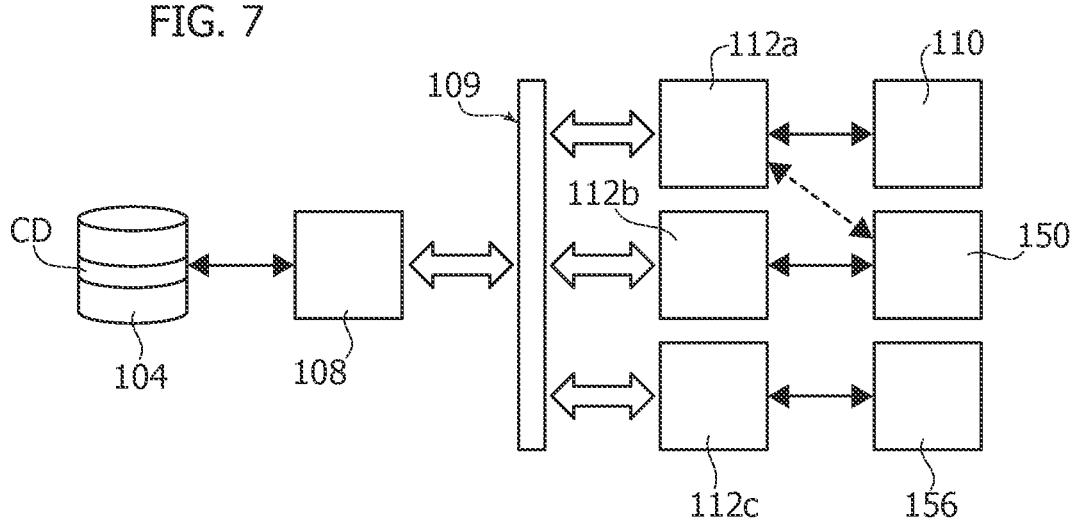
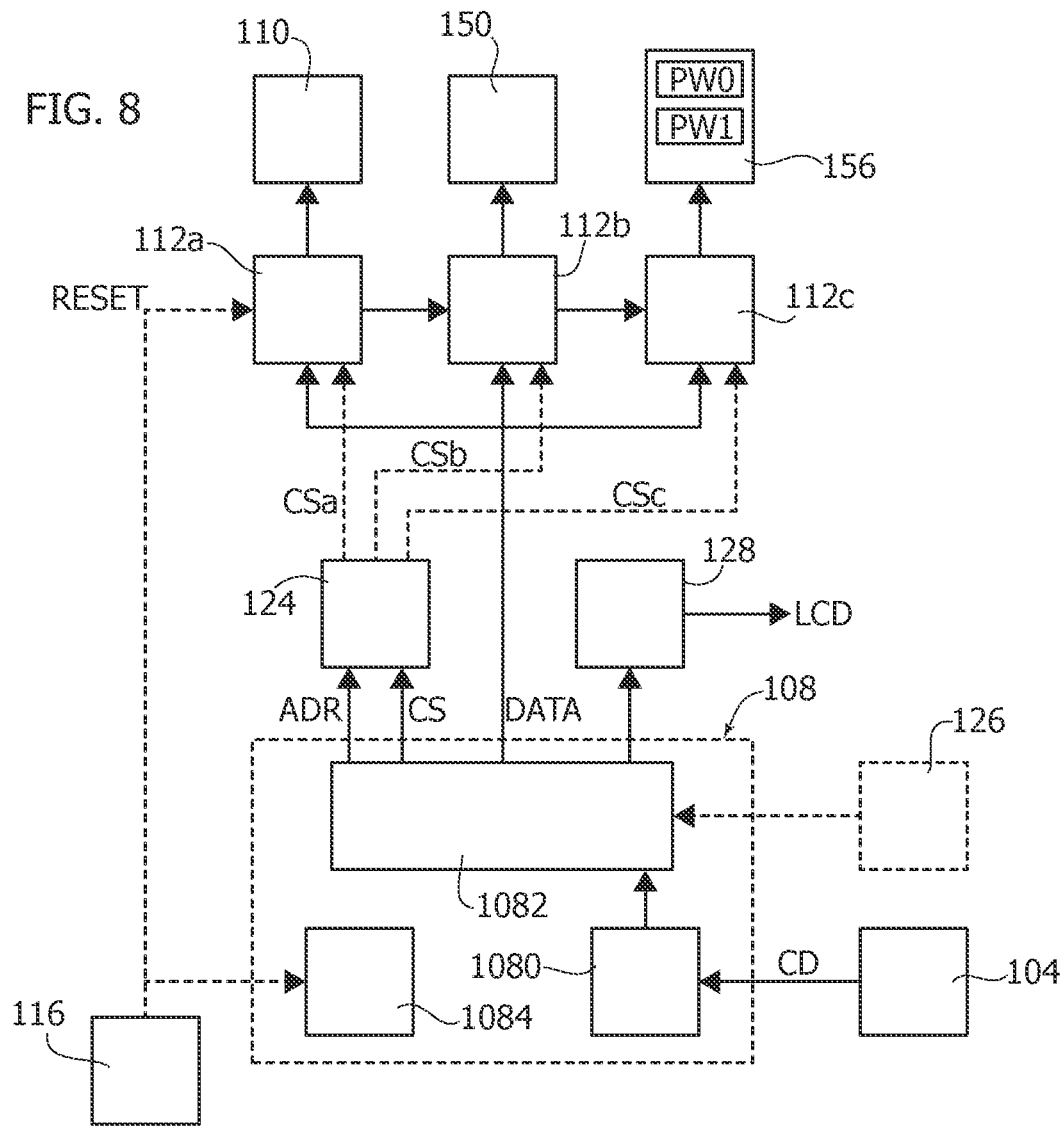

PROCESSING SYSTEM, RELATED INTEGRATED CIRCUIT, DEVICE AND METHOD

CROSS-REFERENCE TO RELATED APPLICATIONS

This application claims the benefit of Italian Patent Application No. 102021000030332, filed on Nov. 30, 2021, which application is hereby incorporated herein by reference.

TECHNICAL FIELD

Embodiments of the present disclosure relate to the protection of processing systems against the modifications of registers.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:

one or more communication interfaces IF, e.g., for exchanging data via the communication system 20, such as a Universal asynchronous receiver/transmitter (UART), Serial Peripheral Interface Bus (SPI), Inter-Integrated Circuit (IC), Controller Area Network (CAN) bus, and/or Ethernet interface, and/or a debug interface; and/or one or more analog-to-digital converters AD and/or digital-to-analog converters DA; and/or one or more dedicated digital components DC, such as hardware timers and/or counters, or a cryptographic co-processor, and/or one or more analog components AC, such as comparators, sensors, such as a temperature sensor, etc.; and/or one or more mixed signal components MSC, such as a PWM (Pulse-Width Modulation) driver.

Generally, a dedicated digital components DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

Future generations of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.).

In parallel, the security framework of each processing system 10 becomes also more and more complex. Usually, the security framework is based on the concept of resource protection, i.e., given a set of resources, the framework is designed so that the access to one or more resources may be selectively blocked or granted based on specific conditions. For example, often access to given resources, such as memory areas of the non-volatile memory 104 and/or a debug interface, may be blocked by storing one or more bits to reserved memory locations of a non-volatile memory 104. Additionally or alternatively, often access to the resource may be blocked until the given password is provided, e.g., via the microprocessor 102 or a communication interface IF.

In this respect, the status whether access to a given resource is blocked or granted is usually stored to a register, e.g., implemented with one or more flip-flops. However, this implies that a hacker could try to modify the content of such registers in order to grant access to a blocked resource.

SUMMARY

Embodiments provide solutions able to protect registers, in particular the configuration registers used to store security information, such as configuration registers configured to store data identifying whether access to a resource is granted or blocked and/or configuration registers configured to store one or more reference passwords.

According to one or more embodiments, one or more of the above objectives is achieved by means of a processing system having the features specifically set forth in the claims that follow. Embodiments moreover concern a related integrated circuit and method.

As mentioned before, various embodiments of the present disclosure relate to a processing system. Specifically, the processing system comprises a plurality of storage elements, wherein each storage element comprises a latch or flip-flop and is configured to receive a write request comprising a data bit and store the received data bit to the latch or flip-flop. Accordingly, a hardware circuit may be configured to change operation as a function of the logic level stored to the latch or flip-flop of at least one first storage element of the plurality of storage elements.

Specifically, in various embodiments, the first storage elements may be used to store security related configuration data. For example, as will be described in greater detail in the following, the hardware circuit may comprise at least one sub-circuit, such as a resources/peripheral, a memory controller or a microprocessor, and a protection circuit configured to receive a control command for the sub-circuit and selectively execute (or inhibit execution of) the control command, i.e., selectively forward (or not forward) the control command to the sub-circuit. For example, in various embodiments, the processing system comprises a microprocessor and/or a debug interface configured to provide such a control command to control operation of the hardware circuit. For example, the control command may be a read or write request.

Accordingly, the protection circuit may selectively execute the control command (at least) as a function of the logic level stored to the latch or flip-flop of a first storage element. For example, the data bit stored to the first storage element may correspond to configuration data and/or lifecycle data.

Accordingly, in various embodiments, the processing system comprises also a non-volatile memory configured to store data bits for the plurality of storage elements, and a hardware configuration circuit configured to read the data bits from the non-volatile memory and generate write requests in order to store the data bits to the storage elements.

In various embodiments, the processing system is configured to protect the data stored to the latch or flip-flop of the first storage element(s) against tamper attacks. For this purpose, the first storage element comprises a further latch or flip-flop and is configured to store, in response to the write request, the inverted version of the received data bit to the further latch or flip-flop. Moreover, the first storage element comprises also a combinational logic circuit configured to compare the logic level stored to the latch or flip-flop of the first storage element with the logic level stored to the further latch or flip-flop of the first storage element. Specifically, in various embodiments, the first storage element is configured to de-assert a first tamper signal associated with the first storage element when the logic levels are different, and assert the first tamper signal when the logic levels are the same.

Accordingly, in various embodiments, the hardware circuit is configured to change operation also as a function of the first tamper signal. For example, a protection circuit of the hardware circuit may be configured to selectively execute the control command as a function of the logic level stored to the latch or flip-flop of the first storage element and the first tamper signal. For example, the protection circuit may be configured to execute (i.e., forward) the control command when the latch or flip-flop of the first storage element has stored a first logic level and the first tamper signal is de-asserted, and inhibit execution of (i.e., not forward) the control command when the latch or flip-flop of the first storage element has stored a second logic level or the first tamper signal is asserted.

Alternatively, the protection circuit may be configured to selectively execute the control command as a function of a control signal, and the hardware circuit or the first storage element may comprise a combinational logic circuit configured to determine whether the first tamper signal is asserted. In this case, in response to determining that the first tamper signal is de-asserted, the combinational logic circuit may set the first control signal to the logic value stored to the latch or flip-flop of the first storage element. Conversely, in response to determining that the first tamper signal is asserted, the combinational logic circuit may set the first control signal to a predetermined tamper value.

Generally, the protection circuit may also be configured to manage access to a plurality of sub-circuits and/or memory areas, wherein with each sub-circuit and/or memory area is associated at least a respective first storage element. In this case, the protection circuit may be configured to inhibit execution of the control command (to a subset or all of the sub-circuits and/or memory areas) when at least one of the first tamper signals provided by the plurality of first storage elements is asserted.

In various embodiments, the hardware circuit may also comprise a password verification circuit configured to receive a password verification command from the microprocessor and/or the debug interface, wherein the password verification command comprising a password. Next the password verification circuit may compare the password with a reference key, wherein the reference key is determined as a function of the logic levels stored to the latch or flip-flop of a plurality of second storage elements of the plurality of storage elements, and assert an overwrite signal when the password corresponds to the reference key. Accordingly, in this case, the protection circuit may be configured to execute (i.e., forward) the control command when the overwrite signal is asserted.

For example, in various embodiments, also each of the second storage elements comprises a further latch or flip-flop and a combinational logic circuit configured to selectively assert a second tamper signal by comparing the logic level stored to the latch or flip-flop of the respective second storage element with the logic level stored to the further latch or flip-flop of the respective second storage element.

In various embodiments, also the password verification circuit may consider the respective tamper signals. For example, the verification circuit may be configured to assert the overwrite signal when the password corresponds to the reference key and the second tamper signals provided by the second store elements are de-asserted, and de-assert the overwrite signal when the password does not correspond to the reference key or at least one of the second tamper signals provided by the second store elements is asserted.

Additionally or alternatively, the protection circuit may be configured to inhibit execution of the control command when at least one of the second tamper signals provided by the second store elements is asserted.

BRIEF DESCRIPTION OF THE DRAWINGS

Embodiments of the present disclosure will now be described with reference to the annexed drawings, which are provided purely by way of non-limiting example and in which:

FIGS. 7 and 8 show embodiments of a processing system comprising a configuration circuit and configuration data clients.

DETAILED DESCRIPTION OF ILLUSTRATIVE EMBODIMENTS

The In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
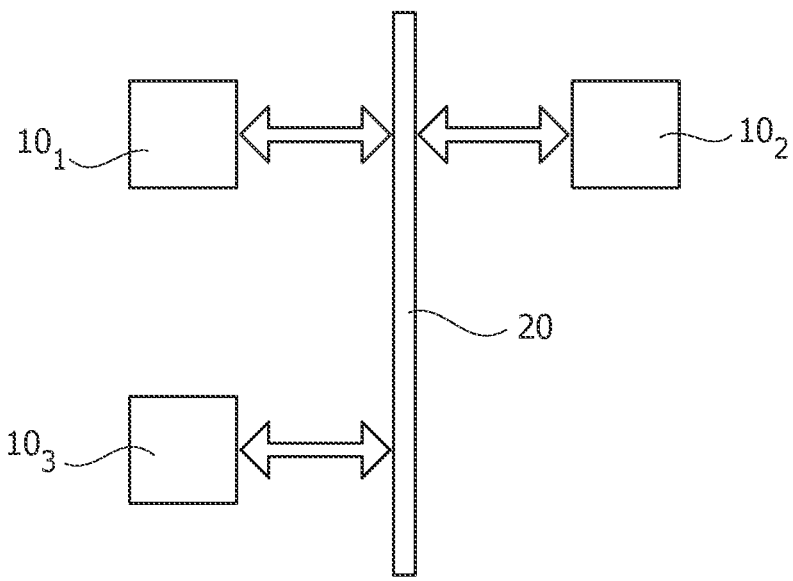
FIG. 1 shows a typical electronic system comprising a plurality of processing systems.
Figure 2:
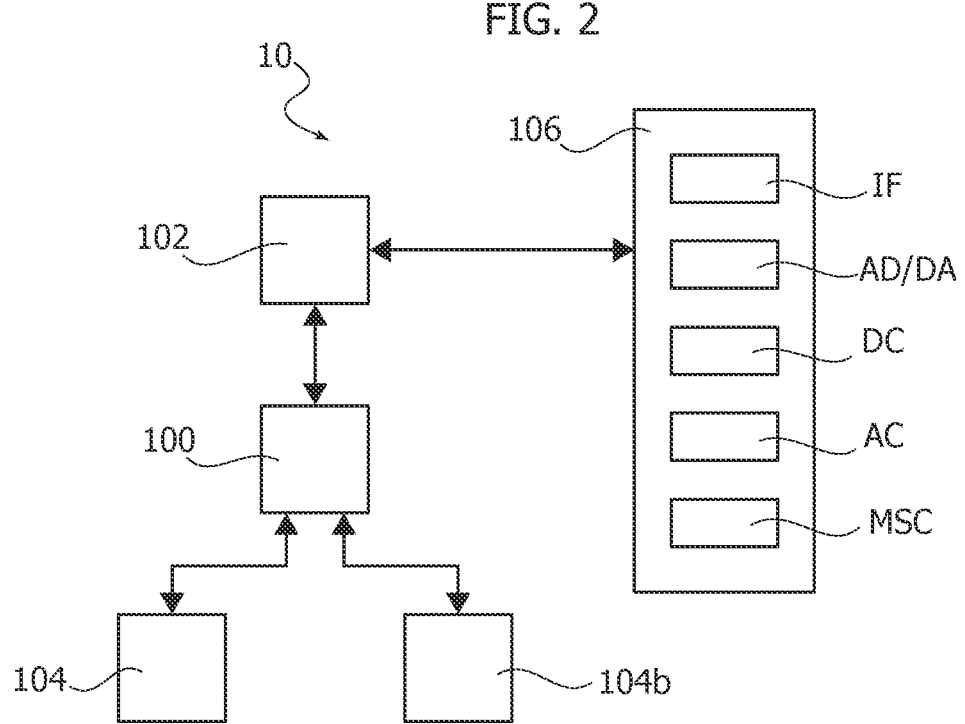
FIG. 2 shows an example of a processing system.

In the following FIGS. 3 to 12 parts, elements or components which have already been described with reference to FIGS. 1 and 2 are denoted by the same references previously used in such Figures; the description of such previously described elements will not be repeated in the following in order not to overburden the present detailed description.

Figure 3:
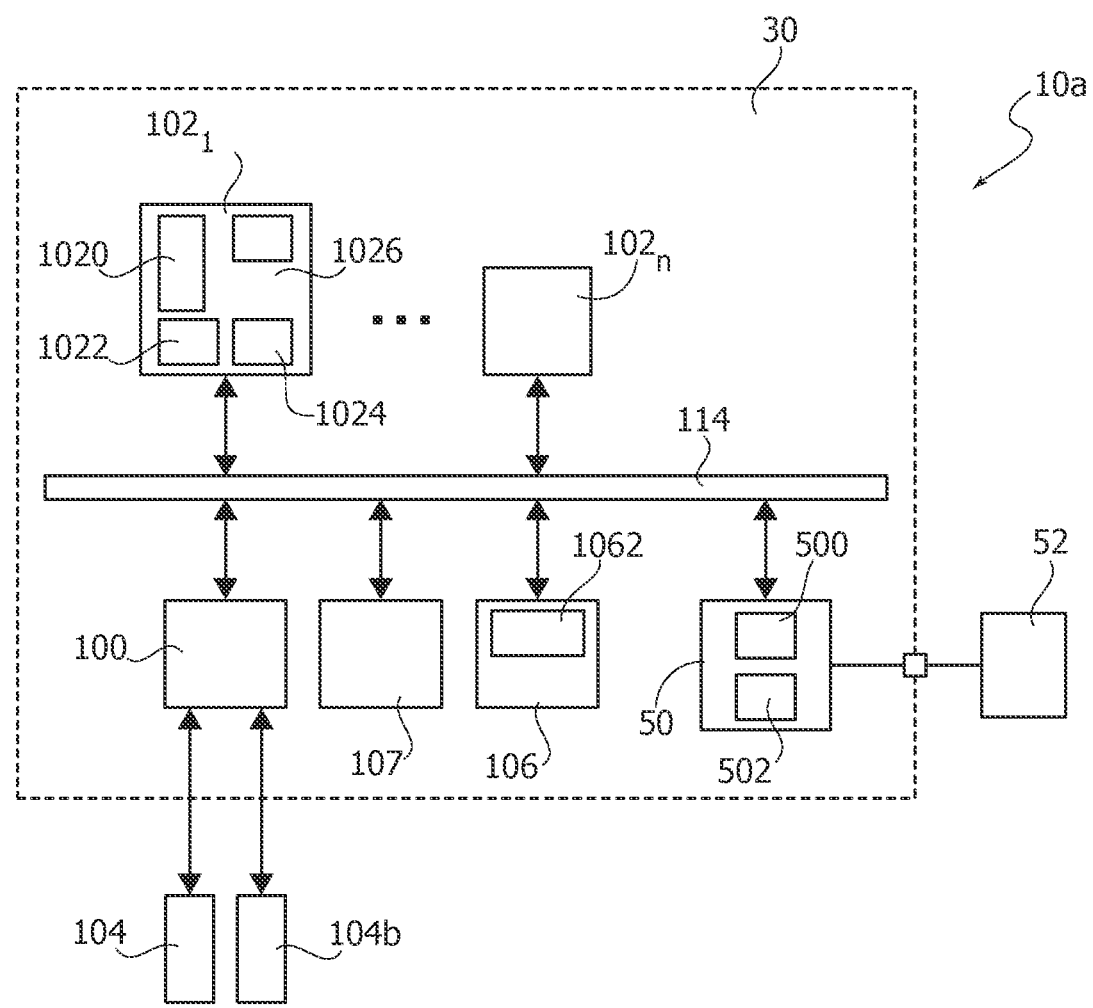
FIG. 3 shows an embodiment of a processing system.

FIG. 3 shows an embodiment of a processing system $10a$ in accordance with the present description.

Specifically, in the embodiment considered, the processing system $10a$ comprises at least one processing core 102 integrated in an integrated circuit 30, such as n processing cores wherein the one or more processing cores 102 are connected to a (on-chip) communication system 114. For example, in the context of real-time control systems, the processing cores $102_1 \ldots 102_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core 1021, each processing core 102 may comprise a microprocessor 1020 and a communication interface 1022 configured to manage the communication between the microprocessor 1020 and the communication system 114. In the embodiment considered, the interface 1022 is a master interface configured to forward a (read or write) request from the microprocessor 1020 to the communication system 114, and forward an optional response from the communication system 114 to the microprocessor 1020. In various embodiments, the processing core $102a$ may also comprise a slave interface 1024. For example, in this way, a first microprocessor 1020 may send a request to a second microprocessor 1020 (via the communication interface 1022 of the first microprocessor, the communication system 114 and the communication interface 1024 of the second microprocessor). For example, for this purpose the communication system 114 may comprise in addition to a system bus or NoC, also an additional co-processor bus, e.g., connecting the microprocessors 1020 of the same processing core $102a$ or all processing cores $102a$.

In various embodiments, each processing core $102_1 \ldots 102_n$ may also comprise further local resources, such as one or more local memories 1026, usually identified as Tightly Coupled Memory (TCM).

As mentioned before, typically the processing cores $102_1 \ldots 102_n$ are arranged to exchange data with a non-volatile memory 104 and/or a volatile memory $104b$. In various embodiments, these memories are system memories, i.e., shared for the processing cores $102_1 \ldots 102_n$. For example, in various embodiments, the processing system $10a$ comprises one or more memory controllers 100 configured to connect at least one non-volatile memory 104 and at least one volatile memory $104b$ to the communication system 114. As mentioned before, one or more of the memories 104 and/or $104b$ may be integrated in an integrated circuit 30 comprising the processing core(s) 102 or may be connected externally to the integrated circuit 30.

As mentioned before, the processing system $10a$ may comprise one or more resources 106, such as one or more communication interfaces or co-processors (e.g., a cryptographic co-processor). The resources 106 are usually connected to the communication system 114. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus. For example, each of the resources 106 may be connected to the communication system 114 via a slave interface 1062 of the resource 106 and/or via a DMA controller 107 comprising a master interface configured to exchange data directly by sending read or write requests to the communication system 114.

As shown in FIG. 3, the integrated circuit 30 of the processing system $10a$ may also comprise a debug interface 50. For example, a typical debug interface 50 comprises two sub-circuits: a communication interface 502, such as a JTAG (Joint Test Action Group), CAN, SPI or PC communication interface managing the exchange of data with the external debugger 52, and an internal debug circuit 500 configured to manage the debug operations, e.g., by sending read or write requests via the communication system 114 or a dedicated debug bus. In general, the debug circuit 500 may also be implemented via software instructions executed via a processing core 102, e.g., by receiving the debug commands via one of the communication interfaces IF of the processing system boa.

As mentioned before, in various embodiments, the processing system boa comprises a security architecture configured to limit access to one or more of the resources of the processing system boa.

Figure 4:
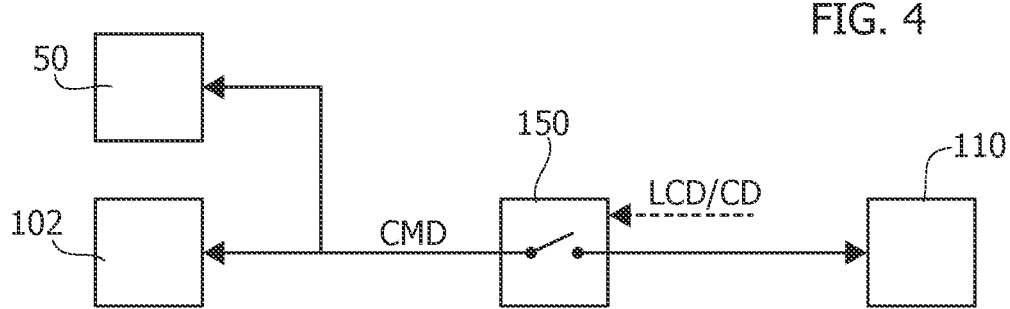
FIG. 4 shows an embodiment of the security architecture of a processing system.

FIG. 4 shows an embodiment of the security architecture of a processing system boa.

As mentioned before, the security architecture of a processing system 10a, such as a microcontroller, is aimed to limit access to one or more of the circuits of the processing system 10a, indicated in the following as resources 110, such as the memories 104 and/or 104b, one or more of the processing units 102 and/or one or more resources 106.

For example, as shown in FIG. 4, one or more of the resources 110 of the processing system may have associated (e.g., comprise) a protection circuit 150 configured to control access to the respective resource 110. For example, respective access requests CMD may be received from another resource of the processing system 10a, such as the processing unit 102 and/or the debug interface 50.

For example, in various embodiments, the protection circuits 150 may control the access to a target resource 110 by selectively forwarding read or write from the source resource (e.g., a processing unit 102 and/or the debug interface 50) to the target resource 110. Generally, these read or write may be forwarded via the communication system 114 (e.g., in case of a processing core 102) or via a dedicated debug communication system/bus (e.g., in case of a hardware debug interface 50). For example, the protection circuits 150 may be configured to:
  selectively forward the read or write from the source resource to the communication system; and/or
  selectively forward the read or write from the communication system to the target resource 110.

However, in general, the protection circuit 150 may also be implemented within the target and/or source resources. For example, as mentioned before, a typical debug interface 50 comprises a communication interface 502 managing the exchange of data with the external debugger 52, and an internal debug circuit 500 configured to manage the debug operations. Accordingly, in this case, the protection circuit 150 may be configured to deactivate the debug interface 50 by interrupting the connection between the communication interface 500 and the internal debug circuit 502 and/or the connection of the communication interface 500 to the pins to which an external debugger 52 may be connected.

Generally, while some resources 110 may possibly not have any access restrictions at all, the access to other resource 110 may be blocked (i.e., the protection may be activated) by default or selectively as a function of configuration data. For example, in various embodiments and as also described in detail in United States Patent Application Publications US 2018/0357015 A1 and US 2018/0357012 A1, which are incorporated herein by reference for this purpose, the protections of a given resource may be activated selectively as a function of the life cycle stage of the processing system 10a as indicated by life cycle data LCD and/or configuration data CD. For example, each protection 150 of the processing system 10a may be in one of the following states:
  a) the life cycle data LCD indicate that the protection is disabled independently of the configuration data CD;
  b) the life cycle data LCD indicate that the protection may be enabled selectively and the configuration data CD indicate that the protections is disabled;
  c) the life cycle data LCD indicate that the protection may be enabled selectively and the configuration data indicate that the protections is enabled; or
  d) the life cycle data LCD indicate that the protection is enabled independently of the configuration data CD.

For example, in the context of a memory 104 and/or 104b, the memory range of the memory may be divided into sectors, and with each sector may be associated one or more bits of respective configuration data CD, which thus indicate whether a read and/or a write access to the respective memory sector is permitted or not.

Figure 5:
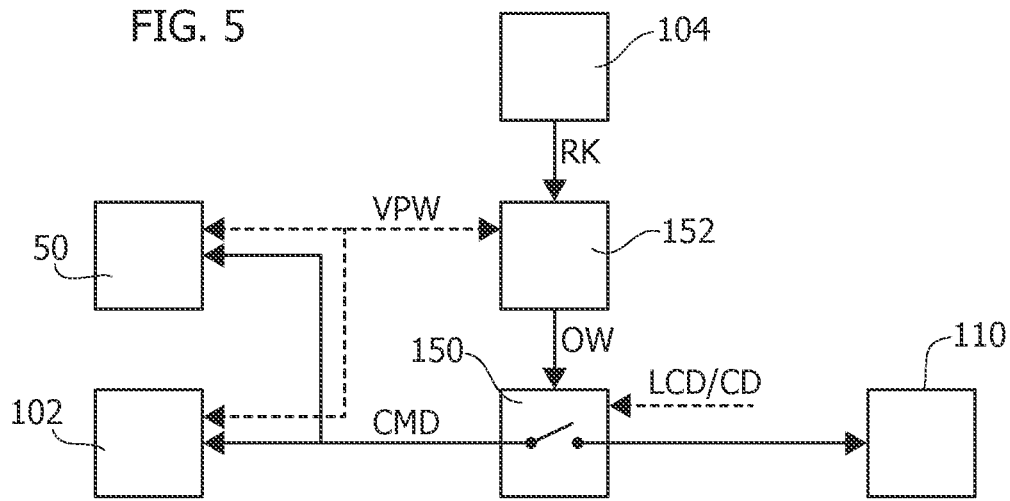
FIG. 5 shows an embodiment of the security architecture of a processing system comprising a password verification circuit.

FIG. 5 shows an embodiment of a modified security architecture of the processing system boa.

Specifically, in the embodiment considered, in order to grant access to protected resources, the processing system 10a comprises a circuit for overwriting one or more of the protections when a specific password is provided. Generally, some protections 150, once activated, may also not be deactivated anymore, or a given password may only deactivate a given sub-set of protections. For example, read protected memory areas containing security related data, such as cryptographic keys, may never be accessed, even when a password is provided.

In the example considered, at least one reference password/keyword RK is stored in some way in the processing system boa. For example, the reference password RK may be hardwired or stored in a non-volatile memory 104 of the processing system 10a, such as the non-volatile program memory 104a. In the latter case, the processing system boa is preferably configured to limit read access to the memory area containing the reference password RK in order to ensure that the reference password RK is kept secret. For example, possible solutions for storing a reference keyword in a non-volatile memory are described in the above cited patent applications.

In the example considered, the processing system boa comprises moreover a password verification circuit 152.

Accordingly, in order to deactivate at least one protection, the user should be able to provide a password verification command VPW comprising a password/keyword K to the password verification circuit 152. For example, in the embodiment considered, the user may provide the password K to the password verification circuit 152 via software instructions executed by the processing unit 102 of the processing system boa and/or via a communication interface of the processing system boa, such as via a CAN interface or a (e.g., JTAG) debug interface 50 connected to an external debugger 52.

For example, in various embodiments, the blocks 110, the password verification circuit 152, and the interface IF and/or the processing unit 102 may be connected through a suitable communication system, such as the communication system 114. In this case, the command CMD and the password verification command VPW may be transmitted over the same bus, specifying as target address either the address of a block 110 (for a command CMD) or the password verification circuit 152 (for a password verification command VPW).

Accordingly, once the password verification circuit 152 has received the password verification command VPW comprising the password K, the password verification circuit 152 may obtain the reference password RK and compared the password K with the reference password RK and, in case the two passwords match, the password verification circuit 152 may generate an overwrite signal OW, which is sent to one or more protection circuit 150. Accordingly, in response to the overwrite signal OW, the protection circuit(s) 150 may deactivate at least part of the respective protection.

Figure 6:
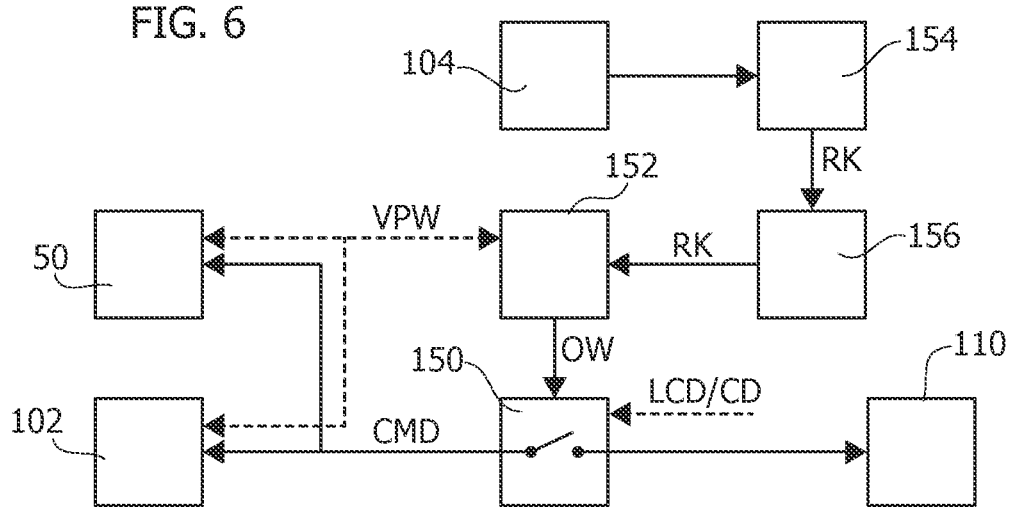
FIG. 6 shows an embodiment of the security architecture of a processing system comprising a password verification circuit and a temporary password repository.

FIG. 6 shows an embodiment of the security architecture of a processing system 10a in line with the disclosure of United States Patent Application Publication US 2019/026498 A1, which is incorporated herein by reference.

Specifically, compared to FIG. 5, the processing system 10a comprises moreover a password upload circuit 154 and a temporary password repository 156.

Accordingly, in the example considered, the password verification circuit 152 does not access dynamically the original reference password(s) RK, which is hardwired or preferably stored in the non-volatile memory 104. Conversely, the password upload circuit 154 reads the reference password(s) RK once and stores the reference password(s) RK in the temporary password repository 156, which is implemented, e.g., with registers, which may only be read by the password verification circuit 152. Accordingly, the password verification circuit 152 may compare the received password K with a reference password RK stored in the temporary password repository 156, wherein the read path between the password verification circuit 152 and the temporary password repository 156 is not shared with other resources of the processing system 10a and accordingly may not be spied.

Accordingly, as described in the foregoing, in various embodiments, the protections may be activated and similarly also the blocks 110 may be configured based on life cycle data LCD and/or configuration data CD.

For example, FIG. 7 shows an example of a processing system 10a, wherein the configuration data CD may be written into specific areas of a non-volatile memory and retrieved when the processing system boa is powered on.

For example, the configuration data CD may be stored in the non-volatile memory 104 and/or an additional non-volatile memory, such as a one-time programmable (OTP) memory, e.g., implemented with fuses. For example, the memory 104 may be used, in case the memory is integrated with the microprocessor 10 in the same integrated circuit 30. Conversely, an additional non-volatile memory may be used, in case the memory 104 is an external memory. Accordingly, in various embodiments, the configuration data CD are stored in a non-volatile memory of the integrated circuit 30.

For example, such configuration data CD may include calibration data used to guarantee that the hardware behavior is uniform, thereby compensating possible production process tolerances. For example, this applies often to the calibration of analog components of the processing system, such as a temperature sensor, analog-to-digital converter, voltage reference, etc. Moreover, as mentioned before, the configuration data CD may also be used to customize the behavior of the hardware, e.g., the hardware blocks 110 and/or the protection circuits 150, according to different application needs. For example, as mentioned before, once the firmware of the processing system boa has been stored in the processing system boa, some configuration data CD may be written in order to deactivate the debug interface 50, which e.g., could be used to download the firmware of the processing system boa. Thus, generally a first part of the configuration data CD may be written by the producer of the hardware of the processing system (e.g., the producer of an integrated circuit), and/or a second part of the configuration data CD may be written by the developer of the firmware of the processing system 10a.

In various embodiments, the programmed configuration data CD are read during a configuration phase, which usually starts as soon as the processing system 10a is powered on.

Specifically, as shown in FIG. 7, the processing system 10a may comprise for this purpose a configuration circuit 108 configured to read the configuration data CD from the non-volatile memory 104, and distribute these configuration data CD within the processing system 10a. For example, in the embodiment considered, the configuration data CD are stored in reserved memory areas, e.g., in the form of a plurality of consecutive memory locations. Accordingly, in the embodiment considered, the configuration circuit 108 accesses the reserved memory areas containing the configuration data CD, reads the configuration data CD and transmits the configuration data CD to a respective block 110 and/or protection circuit 150 within the processing system 10a. As mentioned before, the block 110 may correspond to any block of the processing system 10a requiring configuration data and may correspond to the processing unit 102, a hardware resource 106 or even a memory (e.g., the memory 104a).

For example, in order to distribute the configuration data CD, each block 110 and each protection circuit 150 may have associated a respective configuration data client 112. For example, in FIG. 7 are shown two configuration data clients 112a, 112b which provide the configuration data to a circuit 110 and the protection circuits 150, respectively. Generally, each configuration data client 112 may be associated univocally with a single circuit 110 or a single protection circuit 150, and provide configuration data only to the associated circuit 110 or protection circuit 150, e.g., a specific hardware resource 106. However, the configuration data client 112 may also be associated with a plurality of hardware blocks 110 and/or protection circuits 150. For example, in various embodiments, the same configuration data client 112 is used to provide configuration data CD to a circuit 110 and the protection circuit 150 associated with this hardware block 110. In general, the configuration data clients may also be integrated in the respective circuit 110 or protection circuit 150.

Accordingly, in the embodiment considered, the configuration circuit 108 may determine for each target block 110/150 to be configured the respective configuration data (selected from the configuration data CD) and transmit the configuration data associated with the target block 110/150 to the configuration data client 112 associated with the target block 110/150. Similarly, while reading the configuration data CD from the memory 104, the configuration circuit 108 may determine the target block(s) for the current configuration information and send the current configuration data to the configuration data client(s) associated with the respective target block(s). Generally, any communication may be used for transmitting the configuration data CD to the configuration data clients 112, including both serial and parallel communications. For example, the configuration circuit 108 and the configuration data clients 112 may be connected via a bus 109, possibly also corresponding to the communication system 114, and each configuration data client 112 may have associated a respective target address.

Accordingly, each configuration data client 112 is configured to receive the configuration data from the module 108, store them into internal register, e.g., store them into one or more internal flip-flops or latches. The data stored in the register may then be used to generate one or more signals, which influence the behavior of one or more hardware blocks 110 and/or protection circuits 150.

In various embodiments, the above describe mechanism is also used to transmit the reference passwords RK to the temporary password repository 156. Specifically, in various embodiments, the reference password(s) RK are stored together with the configuration data CD in the memory 104, and one or more configuration data clients 112c are associated (preferably univocally) with the temporary password repository 156. Accordingly, in various embodiments, the configuration circuit 108 reads also the reference password(s) RK together with the other configuration data CD from the memory 104 and sends the reference password(s) RK to the configuration data client(s) 112c associated with the temporary password repository 156, thereby loading the reference password(s) RK into the temporary password repository 156.

FIG. 8 shows in this respect a possible embodiment of the communication between the configuration circuit 108 and the configuration data clients 112 in line with the disclosure of US 2019/026498 A1.

Specifically, also in this case, the processing system 10*a* comprises a configuration circuit 108 configured to read the configuration data CD from one or more non-volatile memories 104 and a plurality of configuration data clients 112 configured to receive respective configuration data CD from the configuration circuit 108 and distribute them among the blocks 110/150/156 requiring configuration data. For example, as mentioned before, each configuration data client 112 may be associate univocally with a respective circuit 110/150/156. For example, in the embodiment considered, the processing system 10*a* comprises again three groups of configuration data clients 112*a*, 112*b* and 112*c*.

In the embodiment considered, the configuration circuit 108 comprises a data read module 1080 configured to read the configuration data CD from the memory 104 and a dispatch module 1082 configured to transmit the configuration data to the configuration data clients 112.

As mentioned before, any communication may be used for communication between the dispatch module 1082 and the configuration data clients 112. For example, in various embodiments, the communication between the dispatch module 1082 and the configuration data clients 112 is based on data frames in accordance with a given format, called in the following Device Configuration Format (DCF). For example, in various embodiments, each data frame comprises two fields: the payload (i.e., the real data), called DCF Format payload, and possible additional data attributes used to identify the receiver of the data, called DCF Format attributes, wherein the receiver is one of the configuration data clients 112 representing a DCF client. For example, the data attributes may consist in 16 or 32 bits, wherein a given number of bits specifies the address of one of the configuration data clients 112, and the payload may consist in 16 or 32 bits. For example, in various embodiments, the data read module 1080 is configured to read blocks of 64 bits from the memory 104, wherein the first 32 bits contain the data attributes (including the address of a configuration data client) and the second 32 bits contain the configuration data to be transmitted to the address specified in the data attributes.

As described before, each configuration data client/DCF client 112 may be a hardware circuit, usually comprising a combinational circuit configured to store the received data in an internal register implemented, e.g., with flip-flops/latches, thereby permitting to distribute, via one or more internal signals generated as a function of the data stored in the internal register, the configuration data received to various parts of the associate hardware block(s) 110/150/156. For example, as mentioned before, each configuration data client 112 may have associated a univocal address (i.e., univocal within each processing system 10*a*) and analyses the data transmitted by the dispatch module 1082 in order to determine whether the additional data attributes (DCF Format attributes) contain the address associated with the configuration data client 112.

In various embodiments, the module 108 may also comprises a state control module 1084 configured to manage the various configuration phases of the processing system 10*a*. For example, in various embodiments, once the processing system 10*a* is switched-on, a reset module 116 of the processing system 10*a* may generate a reset signal RESET, which is used to perform a reset of the various components of the processing system 10*a*. For example, the reset signal RESET may correspond to a reset pulse of a given number of clock cycles, provided to the blocks 110 of the processing system 10*a*. For example, in the embodiment considered, the reset signal RESET may be used by the configuration data clients 112 in order to set the internal register to a given reset value.

Similarly, in response to a reset, the state control module 1084 may activate the configuration phase. Specifically, during the configuration phase, the data read module 1080 may read the configuration data CD from the memory 104 and the dispatch module 1082 may send the configuration data CD to the various configuration data clients 112, thereby overwriting the reset values.

For example, in various embodiments, the dispatch module 1082 may generate a data signal DATA having a given number of bits (corresponding to the bits of the payload) containing the configuration data to be transmitted to a given configuration data client 112 and further control signals for selecting the target configuration data client 112. For example, in the embodiment considered, the dispatch module 1082 generates also an address signal ADR containing the address of the target configuration data client 112 and optionally a chip select signal CS used to signal that the address signal ADR and the data signal DATA are valid.

For example, in various embodiments, the address signal ADR (and the chip select signal CS) may be provided to a decoder 124 configured to activate one of the configuration data clients 112 as a function of the address signal ADD. For example, in the embodiment considered, the decoder 124 may set a chip select signal CSa in order to indicate that the configuration data client 112*a* should read the data signal DATA when the address signal ADR corresponds to an address assigned to the configuration data client 112*a* (and the chip select signal CS is set). Similarly, the decoder 124 may set a chip select signal CSb in order to indicate that the configuration data client 112*b* should read the data signal DATA when the address signal ADR corresponds to an address assigned to the configuration data client 112*b* (and the chip select signal CS is set), etc.

Accordingly, as mentioned before, the configuration data CD may also comprise security configuration data used to configure the protections 150, such as the external access to a debug interface or the (read and/or write) access to given memory locations, and the reference passwords RK to be stored in the temporary password repository 156.

Specifically, in various embodiments, each piece of configuration data is inserted in a frame together with the identifier/address of a configuration data client 112. The hardware configuration circuit 108 reads all these DCF data frames programmed in the non-volatile memory 104 and sends them to the respective configuration data clients 112.

Accordingly, by including the reference password(s) RK in the DCF data frames having the address of the configuration data client(s) 112*c* associated with the temporary password repository 156, the reference password(s) RK may be stored in temporary password repository 156.

For example, as shown in FIG. 8, the temporary password repository 156 may comprises one or more slots PW0, PW1, . . . , each slot being adapted to store a respective reference password RK. Moreover, in the embodiment considered, a single configuration data client 112*c* is associated with the temporary password repository 156. In this case, a plurality of DCF frames (each comprising a respective reference password RK) may be sent in sequence to the address of the configured data client 112c and, once a reference password RK is received, the temporary password repository 156 may store the reference password into a respective slot PW0, PW1, . . . of the internal memory. Generally, the DCF frame may also include a field indicating the slot number, where the respective reference password RK should be stored.

Generally, due to the fact that the configuration data clients 112 comprise also internal registers, these registers may also be used directly as memory of the temporary password repository 152. For example, in this case, a plurality of configuration data clients 112c may be associated with the temporary password repository 152, wherein each configuration data clients 112c has a respective (univocal) address. In this case, a plurality of DCF frames (each comprising a respective reference password RK) may be sent in sequence to the addresses of the configured data clients 112c.

Once the password loading phase is completed, the reference passwords RK are stored in the memory of the temporary password repository 152. Accordingly, there is no need to further access the reference passwords RK stored in the non-volatile memory 104 upon a password challenge request. Accordingly, in the embodiment considered, the communication may not be spied by other blocks of the processing system 10a, because the other blocks are not operative during the configuration phase of the processing system 10a.

Generally, due to the organization of the configuration data CD in data packets, the configuration data CD may thus comprise at least two sub-sets of configuration data, such as:
a first group of configuration data (e.g., calibration data) written by the producer of the processing system boa, e.g., the chip manufacture; and
a second group of configuration data written during a later stage, such as configuration data written by the firmware developer and/or a system integrator, such as the producer of an Engine Control Unit (ECU).

For example, in this case, the security configuration data included in the first group of configuration data may also permit to set the access rights to the memory locations, in which the first group of configuration data are stored. For example, in this way, the first group of configuration data may not be overwritten, and/or the memory interface may inhibit a read access to the first group of configuration data (e.g., by the processing unit 102). Conversely, the security configuration data included in the second group of configuration data may be used to configure the behavior of the blocks 110 from a functional point of view, e.g., in order to enable or disable the debug interface, etc. Thus, also in this case, once the debug interface is deactivated, the second group of configuration data may not be overwritten or read. Similarly, the reference password(s) used to unblock the protections may be configured together with the first group and/or second group of configuration data. For example, the first group may contain a reference password for performing access operations to read and/or write protected memory locations and the second group may contain a reference password for enabling again the debug interface.

Conversely, the life cycle data LCD indicate the life cycle of the product. The life cycle is a permanent signature written into a non-volatile memory, which determines the stage of the processing system 10a during its life-time. For example, the life cycle may be encoded with a bit sequence. For example, in various embodiments, the bit sequence LCD may indicate one of the following stages:

"production" (LC1), when the processing system 10a, e.g., a micro-controller, is in the chip factory;
"customer delivery" (LC2), when the processing system 10a has been shipped to the 1st tier customer (e.g., a producer of an engine control unit);
"OEM production" (LC3), when the device has been shipped to a next-level customer (e.g., a car maker);
"in field" (LC4), when the device is installed in the final product (e.g., in a car sold in the market);
"failure analysis" (LC5), when the device is shipped back to producer of the processing system boa or the software developer for diagnostic purposes.

In various embodiments, this bit sequence is stored either at reserved memory locations of the non-volatile memory 104 or in a separate non-volatile memory 126, such as a one-time programmable memory. In various embodiments, the life cycle data LCD is written such that once a certain stage is reached, it is not possible to revert it back to a previous stage, i.e., the life cycle can only advance. For example, this may be implemented with a one-hot encoding in which a fuse is burned each time a given stage has been reached. For example, the advancing of the life cycle to the next stage may be done by the entity who owns the device in the current life cycle stage (e.g., chip producer will advance the life cycle when it is shipped to the customer delivery stage; the 1st tier customer will advance the life cycle when it is shipped to the OEM production stage, etc.).

As shown in FIG. 8, in various embodiments, the hardware configuration circuit 108 may also be configured to read the life-cycle data/bit sequence from the memory 126 (or 104), store the life-cycle data to a register 128 and the signal LCD may correspond to the life-cycle data stored to this register. For example, the hardware configuration circuit 108 may store the life-cycle data to a register by:
storing the life-cycle data to a register of the configuration circuit 108, i.e., the register 128 may be integrated in the configuration circuit 108; and/or
transferring the life-cycle data to one or more dedicated configuration data clients 112, i.e., the register 128 may integrated in one or more configuration data clients 112.

For example, this solution may be used when the life-cycle data are stored to the non-volatile memory 104 and/or when the life-cycle data may be overwritten for test/debug purposes.

Generally, the configuration circuit 108 may also be configured to decode the life-cycle bit sequence read from the memory 126 (or 104). For example, the life-cycle bit sequence read from the memory may correspond to a (e.g., one-hot) encoded bit sequency, and the signal LCD may correspond to a binary encoded sequence indicating a numerical value associated with the respective life-cycle stage. Generally, in this case, the encoded bit sequency or the decoded bit sequency may be stored to the register 128, i.e., the decoding may be performed before or after storing the data to the register 128.

Accordingly, in various embodiments, the processing system 10a comprises registers used to store security relevant information, in particular one or more of:
the registers configured to store the configuration data used to enable or disable the protection circuits 150, such as the registers of the configuration data clients 112b; and/or
the registers configured to store the reference password(s) used to overwrite the protections enforced by one or more of the protection circuits 150, such as the registers of the configuration data clients 112c; and/or the register(s) 128 configured to store the life-cycle data LCD.

The inventors have observed that such registers should thus be protected in order to avoid that the registers may be overwritten intentionally or unintentionally. For example, for this purpose, United States Patent Application Publication US 2019/0227747 A1 discloses embodiments of configuration data clients 112, wherein the configuration data client may be configured to selectively permit or inhibit the overwriting of already stored configuration data as a function of at least one type identification signal. This document it thus incorporated herein by reference for possible embodiments of the configuration data clients 112.

The mechanism just described permits thus to decide whether a given configuration data packet may overwrite previous configuration data already stored to the same client 112, for example in order to avoid that already activated protections may be deactivated again via a subsequent DCF packet address to the same configuration data client 112. However, such a protection does not cover possible tampering attacks. Specifically, such tampering attacks refer to techniques intended to alter the bit state (for example with electro-magnetic attacks) of a flip-flop/latch, usually intended to remove the programmed protection or simply restoring the default bit protection status, which usually corresponds to the unprotected state.

Figure 9:
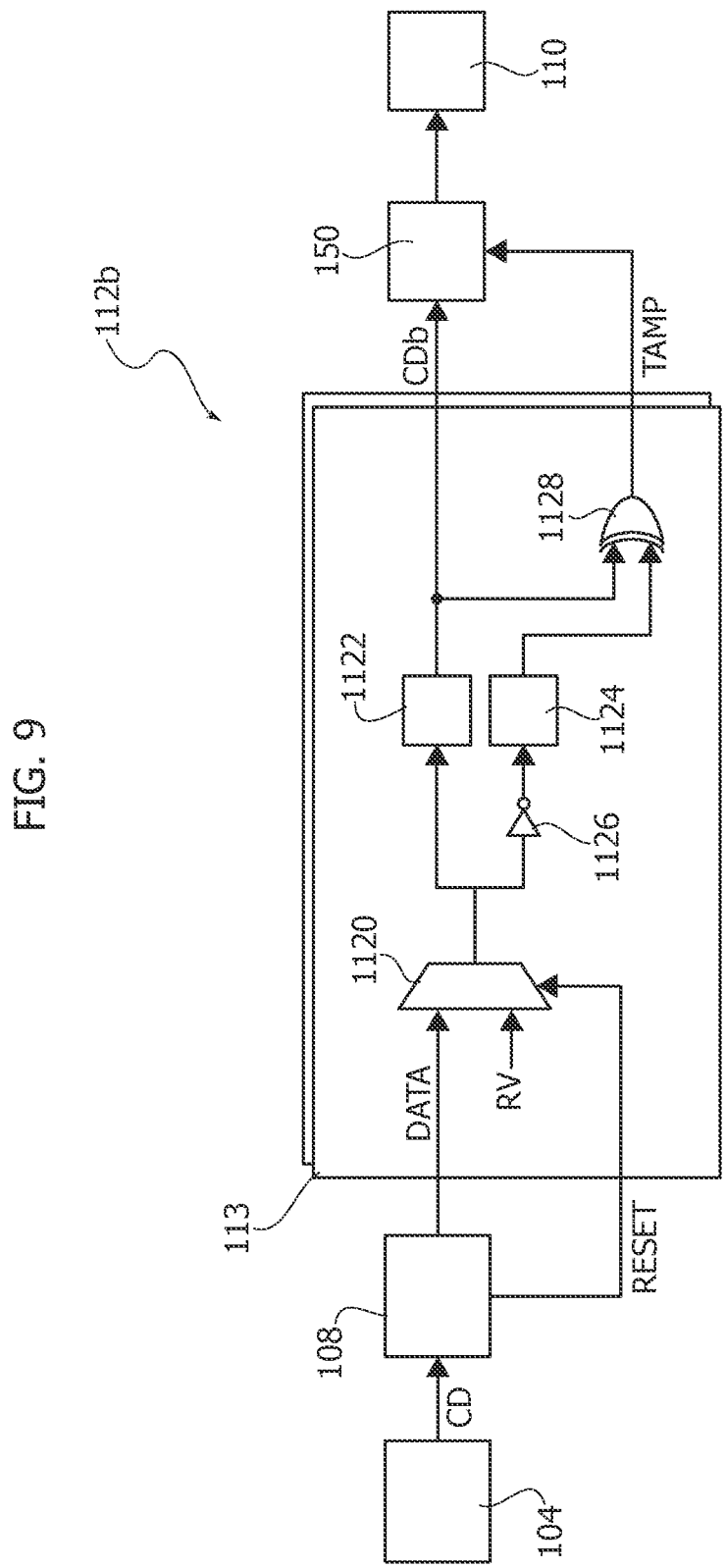
FIGS. 9 to 12 show embodiments of storage elements for the configuration data clients of FIGS. 7 and 8.

FIG. 9 shows in this respect an embodiment of a modified processing system 10a.

Specifically, also in this case, the processing system 10a comprises:
- a protection circuit 150 configured to control access to a respective resource 110 as a function of configuration data, indicated in the following as configuration data CDb;
- a plurality of configuration data clients 112, wherein at least one configuration data client 112b is configured to store the configuration data CDb for the protection circuit 150;
- a non-volatile memory 104 configured to store the configuration data CD for one or more of the plurality of configuration data clients 112, e.g., in the form of data packets, wherein each data packet also comprises an address of a respective configuration data clients 112; and
- a hardware configuration circuit 108 configured to read the configuration data CD from the non-volatile memory 104 and store the configuration data to the configuration data clients 112.

For example, in the embodiment considered, each configuration data client 112 comprises a register configured to store a given number N of bits, such as 32 or 64 bits. Specifically, FIG. 9 shows in this respect a single storage element 113 of the configuration data client 112, wherein the storage element 113 comprises a latch or flip-flop 1122 configured to store a single bit. Accordingly, in various embodiments, each configuration data client 112 comprises N storage elements 113.

As mentioned before, in various embodiments, a given configuration data client 112 may provide configuration data to several circuits 110 and/or protection circuits 150, i.e., the configuration data CDb may correspond to the data provided by a subset of the storage elements 113 of a given configuration data client 112. Additionally or alternatively, in various embodiments, a circuit 110 and/or protection circuit 150 may receive configuration data from several configuration data clients 112, i.e., a given protection circuit 150 may receive configuration data CDb from the storage elements 113 of at least two configuration data clients 112. Generally, the configuration data CDb may thus correspond to one or more bits which indicate whether the protection circuit 150 should enforce one or more security rules.

Accordingly, in various embodiments, each configuration data client 112 is configured to receive a write request comprising data to be written to the storage elements 113 of the configuration data client 112, and in response to the write request store the received data to the latches or flip-flops 1122. For example, the write request may correspond to the previously described data signal DATA and chip select signal CS, or a similar write enable signal. In this respect, while not shown in FIG. 9, the storage element 113 may also be configured to selectively execute the write request as a function of the previous mentioned type identification information, e.g., in order to just execute a first write request and then inhibit further write operations to the latch or flip-flop 1122, thereby ensuring that the stored configuration data may not be overwritten by further write requests.

In this respect, in various embodiments, each configuration data client 112 is configured to reset the content of the storage element 113, in particular the latches or flip-flops 112, to a default/reset value RV in response to a reset signal RESET. For example, as mentioned such a reset signal RESET may be generated by a reset circuit 116, e.g., configured to generate a pulse/trigger in the reset signal RESET when the processing system 10a is switched on and/or in response to other events. Alternatively, the reset signal RESET may also be provided by the configuration circuits 108, e.g., the state control circuit 1084.

For example, in the embodiment considered, the reset signal RESET is provided to a multiplexer 1120, which is configured to store to the latch or flip-flop 1122 either the data provided by the configuration circuit 108, such as a given bit of the previously mentioned signal DATA, or a reset value RV. Accordingly, in order to store the data to the latch or flip-flop 1122, the storage element may be configured to store the signal provided by the multiplexer 1120 is response to the write request (as indicated, e.g., by the chip select signal CS) or in response to the reset signal.

Generally, the reset value RV may either correspond to the logic level 1 or the logic level 0, based on whether the respective bit of the configuration data CDb should be set to high or low by default.

In various embodiments, the storage elements 113, in particular at least the storage elements 113 arranged to store security relevant information, are thus protected against possible tamper attacks.

Specifically, in various embodiments, one or more of the storage elements 113 of a given configuration data client 112, such as a configuration data client 112b, which provide respective one or more bits of configuration data CDb to a protection circuit 150, comprises in addition to the latch or flip-flop 1122 a further latch or flip-flop 1124.

Specifically, in various embodiments, the latches or flip-flops 1122 and 1124 arranged in close proximity within the integrated circuit 30 of the processing system 10a. In fact, the inventors have observed that, in this case, a tamper attack will likely set both the physical latches or flip-flops 1122 and 1124 to 0 or 1, but it will be almost impossible to impose different logic level Accordingly, in order to detect a possible tamper attack, the storage element 113 comprises also a logic NOT gate/inverter 1126 configured to store to the latch or flip-flop 1124 the inverted version of the logic value stored to the register 1122, e.g., by storing to the latch or flip-flop 1124 the inverter version of the bit provided by the multiplexer 1120.

Moreover, the store element comprises an XOR gate 1128 receiving at input the bits values stored to the latches or flip-flops 1122 and 1124 and providing at output a tamper signal TAMP.

Accordingly, in various embodiment, the storage element is configured to store a given bit value (DATA or RV) to the latch or flip-flop 1122 and the respective inverted bit value (DATA or RV) to the latch or flip-flop 1124. Moreover, the storage element 113 is configured to assert the tamper signal TAMP when the latches or flip-flops 1122 and 1124 are set to the same value.

Accordingly, in various embodiments, the one or more storage elements 113 of a given configuration data client 112, which provide respective one or more bits of configuration data CDb to a protection circuit 150, provides also the respective tamper signals TAMP to the protection circuit 150. Accordingly, in this case, the protection circuit 150 may be configured to control access to a respective resource 110 not only as a function of the bits of the configuration data CDb, but also as a function of the respective tamper signals TAMP.

For example, in case the protection circuit 150 is configured to enable or disable access to the associated circuit 110 as a function of the configuration data CDb, e.g., enable access when a given bit of the configuration data CDb is set to the respective reset value RV (e.g., low) and disable access when the given bit of the configuration data CDb is set to the inverted value of the reset value RV (e.g., high), the protection circuit 150 may in any case disable the access when the respective tamper signal TAMP is asserted.

However, in general, the protection circuit 150 may also manage the access to a plurality of circuits 110 or memory areas, such as the access of a debug interface 50 to a plurality of circuits 110 and/or memory areas. For example, in this case, the configuration data CDb may comprise one or more bits for enabling/disabling the access to each of the subcircuits or memory areas. Accordingly, in various embodiments, when a given tamper signal TAMP is asserted, the protection circuit 150 may activate a given configuration (e.g., indicating that the access should be disabled) only for the respective circuit 110 or memory area, a subset of the circuits and/or memory areas, or even all circuits 110 and/or memory areas managed by the protection circuit 150.

Figure 10:
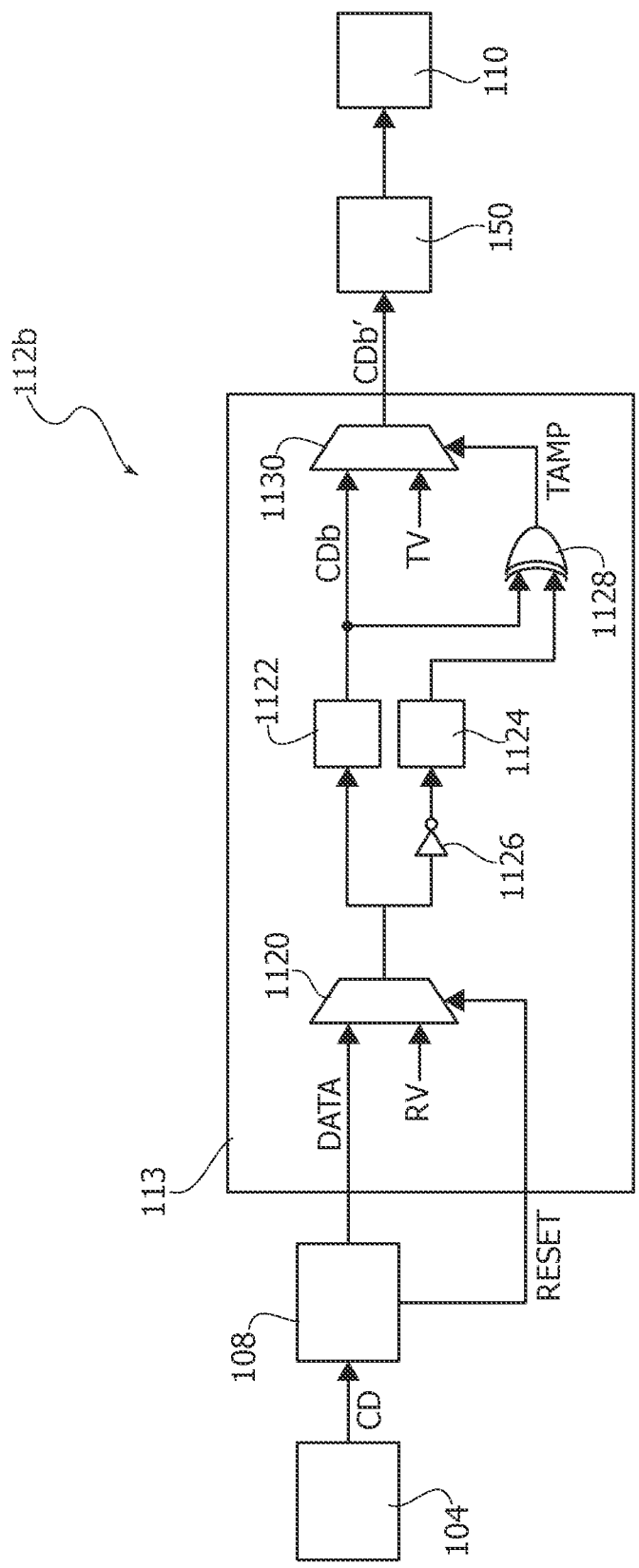

For example, FIG. 10 shows an embodiment, wherein the processing system 10a is configured to activate a given configuration only for the respective bit of configuration data CBb.

Specifically, in the embodiment considered, the bit of configuration data CDb provided by the respective latch or flip-flop 1122 is provided to a multiplexer 1130. The multiplexer 1130 also receives the respective tamper signal TAMP and a value TV indicative of the configuration to be used in case of a tamper attack. Accordingly, in the embodiment considered, the multiplexer 1130 is configured to provide a bit of configuration data CDb' to the protection circuit 150, wherein the bit CDb' corresponds to:

when the tamper signal TAMP is de-asserted, the bit of configuration data CDb provided by the respective latch or flip-flop 1122; or when the tamper signal TAMP is de-asserted, the bit TV.

Generally, the multiplexer 1130 (and similarly the multiplexer 1120) may also be replaced with any other suitable combinational logic circuit. For example, in case the signal TV is set to high, the multiplexer 1122 may be replaced with a logic OR gate receiving at input the bit of configuration data CDb and the tamper signal TAMP.

For example, the combinational logic circuit 113o may be:

integrated in the storage element 113, whereby the storage element already manages the tamper protection for the respective bit and provides a given predetermined configuration TV in case of a tamper attack;

integrated in the protection circuit 150;

be external with respect to the storage element 113 and the protection circuit 150.

Moreover, in line with the previous description, such a combinational logic circuit 1130 may be configured to receive the tamper signals TAMP from a plurality of storage elements 113.

Figure 11:
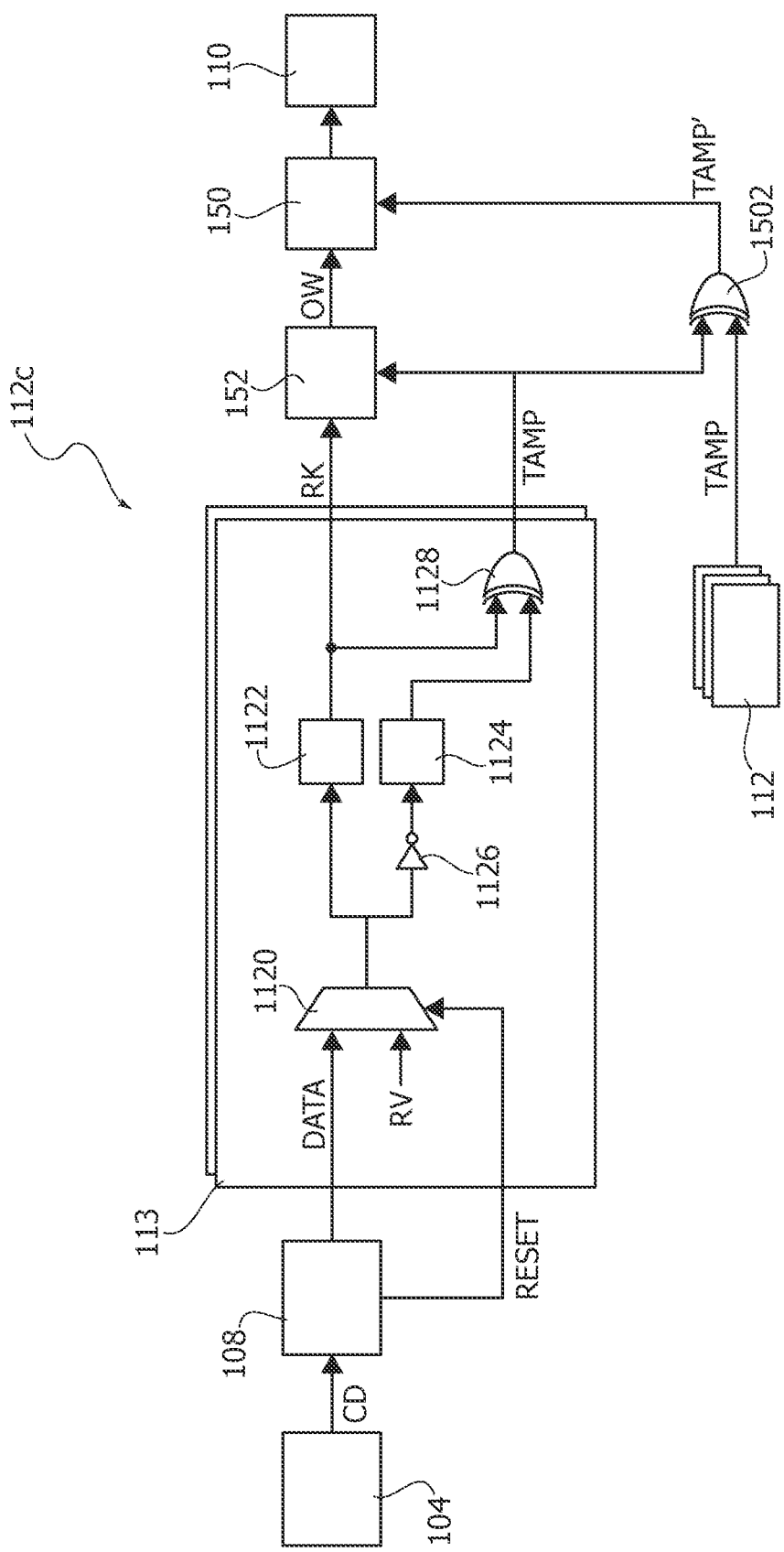

For example, this is also shown in FIG. 11. Specifically, FIG. 11 shows an embodiment, wherein the configuration data client 112 provides a plurality of bits of configuration data to a given associated circuit.

For example, this applies to the configuration data client 112c which provides one or more reference keys RK to the password verification circuit 152.

Accordingly, also in this case, the previous described storage element 113 (with the additional latch 1124 and XOR gate 1128) may be used to provide for each bit of configuration data (as provided by the respective latches 1122) also a respective tamper signal TAMP.

For example, in this case, the password verification circuit 152 may receive a given reference key RK from one or more configuration data clients 112c and the respective tamper signals TAMP.

Specifically, in various embodiments, the password verification circuit 152 is configured to disable the password verification operation when at least one of the received tamper signals TAMP is asserted. In fact, when one of the tamper signals TAMP is asserted, the respective reference key RK is not valid anymore.

Accordingly, in various embodiments, even the password verification command VPW provides a password corresponding to the reference key RK, the password verification circuit 152 is configured to maintain de-asserted the overwrite signal OW.

Accordingly, in this case, the combinational logic circuit configured to combine a plurality of tamper signal TAMP would be implemented within the password verification circuit 152.

However, FIG. 11 schematically shows also a combinational logic circuit 1502, such as an OR gate, configured to generated a combined tamper signal TAMP' by combining a plurality of tamper signals TAMP provided by a given configuration data client 112 and/or by a plurality of configuration data clients 112.

For example, in this way, a protection circuit 150 may receive a combined tamper signal TAMP, which is asserted when at least one of the associated tamper signals TAMP (as received by the respective combinational logic circuit 1502) is asserted.

For example, in this way, the combined tamper signal TAMP' may be asserted when:

as shown in FIG. 9, when a tamper signal TAMP associated with a given bit of configuration data CDb managed by the protection circuit 150 is asserted; and/or as shown in FIG. 11, when a tamper signal TAMP associated with a reference password RK used to overwrite one or more protections managed by the protection circuit 150 is asserted.

As mentioned before, one or more of the protection circuits 150 and/or the password verification circuit 152, may be configured to operate also as a function of life-cycle data LCD.

Accordingly, the previous solutions applied to the configuration data CDb and/or the reference key RK may also be used for the life-cycle data.

Figure 12:
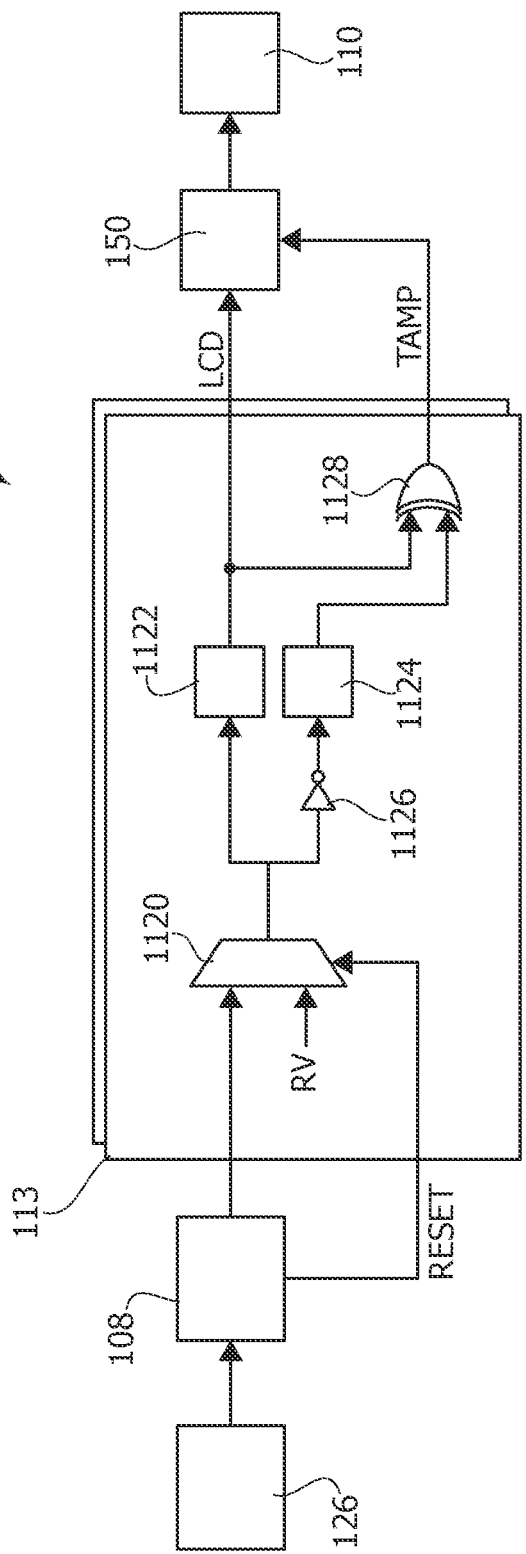

For example, this is schematically shown in FIG. 12, wherein the previously described register 128 configured to store the life-cycle data LCD is replaced with a set of storage elements 113.

Accordingly, in this case the storage element 113 comprises a latch or flip-flop 1122 and a further latch or flip-flop 1124, wherein the life cycle data LCD correspond to the bits stored to the latches or flip-flops 1122, and wherein the storage element 113 is configured to receive a write request comprising a data bit and store, in response to the write request, the received data bit to the respective latch or flip-flop 1122 and the inverted version of the data bit the received data to the respective latch or flip-flop 1124. Also in this case, the storage element 113 may manage a reset signal RESET in order to reset the content of the latch or flip-flop 1122

Moreover, the storage element 113 is configured to assert a tamper signal TAMP for the respective latch or flip-flop 1122 when the respective latches or flip-flops 1122 and 1124 store the same logic level.

For example, in the embodiment considered, the tamper signals TAMP associated with the live-cycle data LCD are provided to the protection circuit 150 (as also described with respect to FIG. 9). However, similar to the embodiments described with respect to FIG. 10 or 11, the protection circuit 150 may receive:
- given predetermined life-cycle data, when at least one of the tamper signals TAMP associated with the life-cycle data LCD is asserted, such as a life-cycle data indicating a life-cycle stage wherein the highest security level is applied, such as the in-field stage; and/or
- a combined tamper signal TAMP' generated by combining the tamper signals TAMP associated with the bits of the life-cycle data LCD.

In various embodiments, the tamper signals TAMP and/or the combined tamper signals TAMP may also be provided to one or more further circuits within the processing circuit 10*a*, such as a microprocessor 1020 and/or an error management circuit. For example, in various embodiments, a combined tamper signal TAMP' is provided as an interrupt signal and/or a register status bit to the microprocessor 1020, and the microprocessor 1020 may be able to read also the content of the associated tamper signals.

Accordingly, in the previous described embodiments, the processing system 10*a* comprises a hardware circuit 110, such as a memory controller 100 or a resource/peripheral 106, and a digital processing circuit 102 and/or a debug interface 50 configured to provide a control command CMD to control operation of the hardware circuit 110.

In various embodiments, the processing system 102 comprises also a protection circuit 150 configured to receive the control command CMD and selectively forward the control command CMD to the hardware circuit 110 as a function of one or more control signals. For example, the one or more control signals may correspond to the configuration data CDb, the life-cycle data LCD and/or the overwrite signal OW.

Specifically, in various embodiments, the processing system 10*a* comprises also one or more storage elements 113, wherein each storage element 113 comprising a respective latch or flip-flop 1122, and wherein the one or more control signals are generated based on the content of the one or more latches or flip-flops 1122. Accordingly, each control signal may correspond to the signal provided by a respective latch or flip-flop 1122, e.g., in case of the configuration data CDb and/or the life-cycle data LCD, or may be generated via more complex logic operations, e.g., in case of the overwrite signal OW generated by the password verification circuit 152.

Specifically, in various embodiments, each storage element 113 comprises a further latch or flip-flop 1124 and is configured to receive a write request comprising a data bit and store, in response to the write request, the received data bit to the respective latch or flip-flop 1122 and the inverted version of the data bit the received data to the respective latch or flip-flop 1124. In various embodiments, the storage element 113 may also receive a reset signal RESET and, in response to the reset signal RESET, reset the content of the latch or flip-flop 1122 to a given reset value RV and the content of the latch or flip-flop 1124 to the inverted version of the reset value RV.

Accordingly, in various embodiments, the processing system comprises a non-volatile memory configured to store the data bits (i.e., the configuration data and/or the life-cycle data bit sequence) and a hardware configuration circuit 108 configured to read the data bits from the non-volatile memory and generate the write requests in order to store the data bits to the storage elements 113.

Specifically, in various embodiments, the storage element 113 is configured to assert a tamper signal TAMP for the respective latch or flip-flop 1122 when the respective latches or flip-flops 1122 and 1124 store the same logic level and de-assert a tamper signal TAMP for the respective latch or flip-flop 1122 when the respective latches or flip-flops 1122 and 1124 store different logic levels.

Accordingly, in various embodiments, the processing system 10*a* is configured such that the protection circuit 150 forwards the control command CMD to the hardware circuit 110 also as a function of the tamper signals TAMP. For example, for this purpose, the protection circuit 150 may:
- directly receive the tamper signals TAMP; and/or
- one or more of the control signals may be generated not only based on the content of the one or more latches or flip-flops 1122 but also as a function of the tamper signals TAMP.

In general, while the previous embodiments mainly relate to security related configuration data, the storage elements 113 may be used to protect also other data, e.g., in order to impose default configuration data in case of a tamper attack (as shown in FIG. 10).

Of course, without prejudice to the principle of the invention, the details of construction and the embodiments may vary widely with respect to what has been described and illustrated herein purely by way of example, without thereby departing from the scope of the present invention, as defined by the ensuing claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A processing system comprising:
a plurality of storage elements, each storage element comprising a latch or a flip-flop and being configured to receive a write request comprising a data bit and to store the received data bit to the latch or the flip-flop;
a non-volatile memory configured to store data bits for the plurality of storage elements;
a hardware configuration circuit configured to read the data bits from the non-volatile memory and generate write requests in order to store the data bits to the storage elements; and
a hardware circuit configured to change operation as a function of a logic level stored to a latch or a flip-flop of a first storage element of the plurality of storage elements,
wherein the first storage element comprises a further latch or a further flip-flop and is configured to store, in response to the write request, an inverted version of the received data bit to the further latch or the further flip-flop,
wherein the first storage element comprises a combinational logic circuit configured to:
compare the logic level stored to the latch or the flip-flop of the first storage element with a logic level stored to the further latch or the further flip-flop of the first storage element,
de-assert a first tamper signal associated with the first storage element when the logic levels are different, and
assert the first tamper signal when the logic levels are the same, and
wherein the hardware circuit is further configured to change operation as a function of the first tamper signal.

2. The processing system according to claim 1, further comprising:
a microprocessor configured to provide a control command to control operation of the hardware circuit,
wherein the hardware circuit comprises a protection circuit configured to:
receive the control command, and
selectively execute the control command as a function of the logic level stored in the latch or the flip-flop of the first storage element and the first tamper signal.

3. The processing system according to claim 2, wherein the protection circuit is configured to:
execute the control command when the latch or the flip-flop of the first storage element stores a first logic level and the first tamper signal is de-asserted, and
inhibit execution of the control command when the latch or the flip-flop of the first storage element stores a second logic level or the first tamper signal is asserted.

4. The processing system according to claim 2,
wherein the protection circuit is configured to selectively execute the control command as a function of a control signal, and
wherein the hardware circuit comprises a combinational logic circuit configured to:
determine whether the first tamper signal is asserted,
in response to determining that the first tamper signal is de-asserted, set a first control signal to a logic value stored to the latch or the flip-flop of the first storage element, and
in response to determining that the first tamper signal is asserted, set the first control signal to a predetermined tamper value.

5. The processing system according to claim 2,
wherein the protection circuit is configured to selectively execute the control command as a function of a control signal, and
wherein the first storage element comprises a combinational logic circuit configured to:
determine whether the first tamper signal is asserted,
in response to determining that the first tamper signal is de-asserted, set a first control signal to a logic value stored to the latch or the flip-flop of the first storage element, and
in response to determining that the first tamper signal is asserted, set the first control signal to a predetermined tamper value.

6. The processing system according to claim 2,
wherein the protection circuit is configured to manage access to a plurality of sub-circuits and/or memory areas,
wherein at least a respective first storage element is associated with each sub-circuit and/or memory area, and
wherein the protection circuit is configured to inhibit execution of the control command when at least one of the first tamper signals provided by a plurality of first storage elements is asserted.

7. The processing system according to claim 2,
wherein the protection circuit is configured to execute the control command when an overwrite signal is asserted, and
wherein the hardware circuit comprises a password verification circuit configured to:
receive a password verification command from the microprocessor, the password verification command comprising a password,
compare the password with a reference key, the reference key being determined as a function of the logic levels stored to a latch or a flip-flop of a plurality of second storage elements of the plurality of storage elements, and
assert the overwrite signal when the password corresponds to the reference key.

8. The processing system according to claim 7, wherein each of the second storage elements comprises a further latch or a further flip-flop and a combinational logic circuit configured to selectively assert a second tamper signal by comparing a logic level stored to the latch or the flip-flop of a respective second storage element with a logic level stored to the further latch or the further flip-flop of the respective second storage element.

9. The processing system according to claim 8, wherein the password verification circuit is configured to:
assert the overwrite signal when the password corresponds to the reference key and the second tamper signals provided by the second storage elements are de-asserted, and
de-assert the overwrite signal when the password does not correspond to the reference key or at least one of the second tamper signals provided by the second storage elements is asserted.

10. The processing system according to claim 8, wherein the protection circuit is configured to inhibit execution of the control command when at least one of the second tamper signals provided by the second storage elements is asserted.

11. The processing system according to claim 1, further comprising:
a debug interface configured to provide a control command to control operation of the hardware circuit, wherein the hardware circuit comprises a protection circuit configured to:
  receive the control command, and
  selectively execute the control command as a function of the logic level stored in the latch or the flip-flop of the first storage element and the first tamper signal.

12. The processing system according to claim 11, wherein the protection circuit is configured to:
  execute the control command when the latch or the flip-flop of the first storage element stores a first logic level and the first tamper signal is de-asserted, and
  inhibit execution of the control command when the latch or the flip-flop of the first storage element stores a second logic level or the first tamper signal is asserted.

13. The processing system according to claim 11,
  wherein the protection circuit is configured to selectively execute the control command as a function of a control signal, and
  wherein the hardware circuit comprises a combinational logic circuit configured to:
    determine whether the first tamper signal is asserted,
    in response to determining that the first tamper signal is de-asserted, set a first control signal to a logic value stored to the latch or the flip-flop of the first storage element, and
    in response to determining that the first tamper signal is asserted, set the first control signal to a predetermined tamper value.

14. The processing system according to claim 11,
  wherein the protection circuit is configured to selectively execute the control command as a function of a control signal, and
  wherein the first storage element comprises a combinational logic circuit configured to:
    determine whether the first tamper signal is asserted,
    in response to determining that the first tamper signal is de-asserted, set a first control signal to a logic value stored to the latch or the flip-flop of the first storage element, and
    in response to determining that the first tamper signal is asserted, set the first control signal to a predetermined tamper value.

15. The processing system according to claim 11,
  wherein the protection circuit is configured to execute the control command when an overwrite signal is asserted, and
  wherein the hardware circuit comprises a password verification circuit configured to:
    receive a password verification command from the debug interface, the password verification command comprising a password,
    compare the password with a reference key, the reference key being determined as a function of the logic levels stored to a latch or a flip-flop of a plurality of second storage elements of the plurality of storage elements, and
    assert the overwrite signal when the password corresponds to the reference key.

16. An integrated circuit comprising:
the processing system according to claim 1.

17. A vehicle comprising:
a plurality of processing systems, each processing system being the processing system according to claim 1,
wherein the processing systems are connected via a communication system.

18. A method for operating a processing system, the method comprising:
  storing data bits for a plurality of storage elements of the processing system to a non-volatile memory of the processing system; and
  switching on the processing system,
  wherein a hardware configuration circuit of the processing system reads the data bits from the non-volatile memory and generates write requests in order to store the data bits to the storage elements of the processing system,
  wherein a first storage element of the processing system:
  compares a logic level stored to a latch or a flip-flop of the first storage element with a logic level stored to a further latch or a further flip-flop of the first storage element,
  de-asserts a first tamper signal associated with the first storage element when the logic levels are different, and
  asserts the first tamper signal when the logic levels are the same.

* * * * *